Patented Aug. 14, 1945

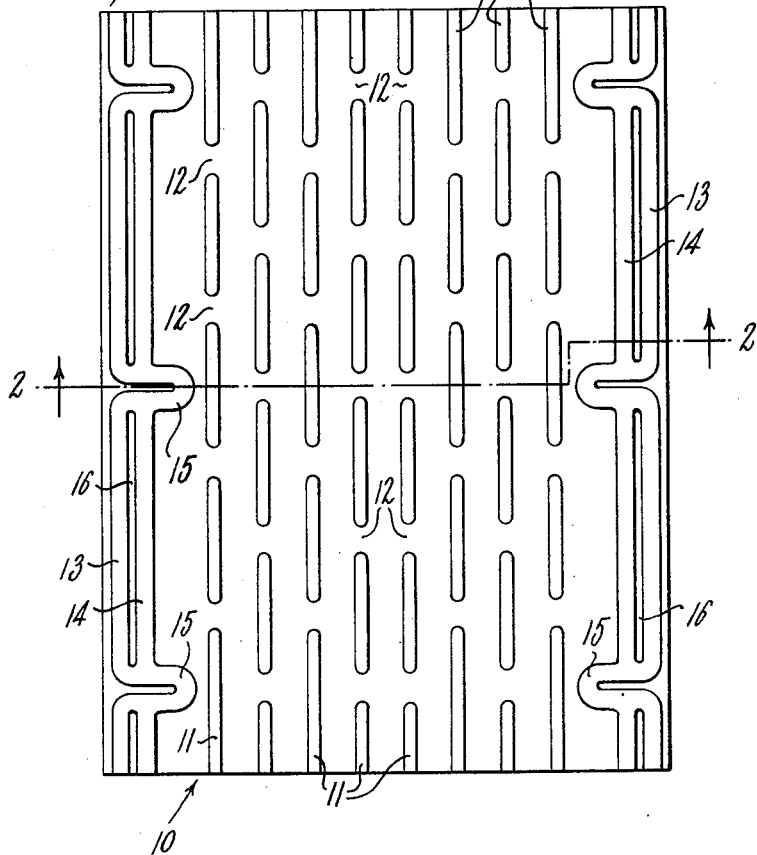

2,382,829

UNITED STATES PATENT OFFICE 2,382,829

BATTERY SEPARATOR

Sherman I. Strickhouser, Edgewood, and Edwin C. Uhlig, Greenwood, R. I., assignors to United States Rubber Company, New York, N. Y., a corporation of New Jersey Application April 5, 1944, Serial No. 529,602

3 Claims. (Cl. 136—145)

This invention relates to battery separators of microporous vulcanized hard rubber or other microporous plastic composition, and is a continuation-in-part of our application Serial No. 501,984, filed September 11, 1943.

The filed application describes and claims a separator of microporous vulcanized hard rubber or heat-softenable microporous plastic compositions or other microporous plastic material suitable for constructing battery separators, and having stiffening ribs which are so constructed that the ribbed area has as low resistance to electrolytic conduction as the flat web area of the separator. Such a construction is produced by forming the separator with raised ribs upon one face and corresponding depressions upon the opposite face. This construction permits good penetration of the battery electrolyte through all portions of the separator and imparts a slight cushioning action to the relatively rigid separator.

The separator as disclosed in the filed application is provided throughout the longitudinal central portion thereof with spaced rows of non-continuous aligned ribs and has adjacent each longitudinal side edge a much wider rib formed with connected laterally extending looped portions, adapted to stiffen such side edge portions.

The present invention employs the same rib construction throughout the longitudinal central portion of the separator as provided in the filed application, but instead of employing along each longitudinal edge portion of the separator the wide rib of said filed application, a double or multiple rib construction is provided which affords greater stiffness to prevent injury of the separator edges than in the separator of the filed application.

A battery separator such as described in said application and also as herein contemplated having the desired rib construction can be produced by providing a heat-softenable microporous sheet of plastic composition, and by heating the sheet to soften the same and while it is in the soft condition it is subjected to an embossing operation that produces raised ribs upon one face of the sheet and corresponding indentations at the other face. The heat-softenable microporous sheet material employed in the present battery separators should have a yield temperature above 100° F. and the molding operation should be carried out at a temperature which is not high enough to close the pores of the microporous sheet.

The features of the battery separator of the present invention will be more fully understood from the following description when read in connection with the accompanying drawing wherein:

Fig. 1 is a plan view of a finished embossed battery separator constructed in accordance with the present invention;

Fig. 2 is a section taken on the line 2—2 of Fig. 1, and

Fig. 3 is a transverse section showing the separator of Fig. 1 positioned between two battery plates.

The battery separator illustrated in the drawing is provided with ribs distributed over its area and adapted to strengthen or stiffen the thin separator sheet and space it from the positive battery plate. These ribs are so formed that the thickness of the sheet material of the separator in the ribbed area is not greater than that of the flat web area, with the result that the elecrolytic conductivity is very nearly uniform throughout all parts of the separator.

In the construction shown the separator 10 is provided throughout a large longitudinal central area with spaced rows of non-continuous aligned ribs 11. These non-continuous ribs have disposed between their adjacent ends the small web portions 12. These portions 12 facilitate the flow of the electrolyte laterally at the face of the separator from one longitudinal row of ribs to another and also prevent the entire separator sheet from spreading laterally when pressure is exerted upon the ribs.

The primary purpose of a battery separator is to prevent metallic conduction between the plates of opposite polarity while freely permitting electrolytic conduction, and the separators are usually made slightly longer and wider than the battery plates. This causes the longitudinal edges of the separator to protrude slightly in an unsupported condition beyond the edges of the plates where they may be injured by bending due to compression between the positive and negative battery plates. To strengthen the longitudinal edges of the separator so that they may offer greater resistance to injury by the aforementioned compression, and to lessen the tendency for the electrolyte to flow laterally beyond the battery plates, the separator in accordance with the present invention is provided with a plurality of slightly spaced longitudinally extending hollow ribs, two of these ribs 13 and 14 being shown in the drawing. At spaced points lengthwise of these slightly spaced ribs are provided the connected laterally extending loop ribbed portions 15. The construction is such that the closely positioned longitudinally extending ribs 13 and 14 which are connected by the narrow depressed portion 16 impart substantial stiffness to the separator adjacent its edges to resist bending, and the looped ribbed portions 15 further resist bending of the marginal edge portions of the separator. Furthermore the longitudinally extending ribs 13 and 14 will lessen the tendency for the electrolyte to flow laterally beyond the battery plates.

A battery separator having the construction herein contemplated may be formed by heating a flat microporous sheet until a temperature is reached at which such material begins to soften and its ability to resist deformation under stress decreases rapidly with further rise in temperature, this is known as the "yield temperature." The sheet is preferably heated by placing it in hot water and while hot and wet is placed in a heated mold adapted to impart the desired rib formation to the sheet. The microporous sheet material used to form the present separator should have a yield temperature above 100° F., and the sheet material may be treated as disclosed in the Baty and Meyer Patent No. 2,329,322 to make it microporous.

It will be seen from the foregoing that by employing the molded hollow rib construction herein contemplated the thickness of the material of the ribs does not exceed the thickness of the non-ribbed or web portion of the sheet, and as a result the electrolytic conductivity is very nearly uniform throughout all portions of the separator sheet, which is highly desirable. It will also be seen that by employing the particular ribbed construction herein shown and described along both marginal side edges of the separator such edges are well adapted to resist forces tending to bend these edges either longitudinally or transversely.

Furthermore if a plurality of ribs 13, 14 are provided close to the side edges of the separator 10 as herein contemplated, at least one of these ribs should occupy a position to abut against the slightly narrower positive plate 17, and the narrow depressed connecting portion 16 should occupy a position to abut against the adjacent negative plate 18 as shown in Fig. 3 of the drawing.

It will therefore be seen that the multiple marginal ribs 13, 14 increase the stiffness of the battery separator and also cooperate with the adjacent battery plates to keep the protruding edge portions of the separator from being displaced laterally.

Having thus described our invention, what we claim and desire to protect by Letters Patent is:

1. A battery separator comprising a microporous sheet of stiff plastic composition having a yield temperature greater than 100° F. and having raised distended ribs upon one face and corresponding indentations at the other face so that the thickness of the material of said ribs does not exceed the thickness of the non-ribbed portion of the sheet and the electrolytic conductivity is very nearly uniform throughout all parts of the sheet, the longitudinal central portion of the sheet having said ribs disposed a substantial distance apart, and each marginal side edge portion of the sheet having a plurality of said ribs disposed side by side so that they almost contact and have stiffening looped ribs extending laterally therefrom in the plane of the separator.

2. A battery separator comprising a microporous sheet of vulcanized hard rubber having raised distended ribs upon one face and corresponding indentations at the other face so that the thickness of the material of said ribs does not exceed the thickness of the non-ribbed portion of the sheet and the electrolytic conductivity is approximately the same for all parts of the separator, the longitudinal central area of the sheet having the above mentioned ribs well spaced, and each marginal side edge of the sheet having a plurality of said ribs disposed side by side so that they almost contact and have stiffening looped ribs extending laterally therefrom in the plane of the separator.

3. A battery separator for separating a positive and a negative plate; said separator comprising a microporous sheet of stiff plastic composition having a yield temperature greater than 100° F. and having raised distended ribs upon one face and corresponding indentations at the other face so that the thickness of the material of said ribs does not exceed the thickness of the non-ribbed portion of the sheet and the electrolytic conductivity is approximately the same for all parts of the separator, the longitudinal central area of the sheet having the above mentioned ribs well spaced, and each marginal side edge of the sheet having a pair of parallel ribs connected by a narrow depressed portion so that this portion will abut against a negative plate and an adjacent rib will abut against the positive plate, and each of said pair of ribs also having stiffening looped ribs extending laterally therefrom in the plane of the separator.

SHERMAN I. STRICKHOUSER.
EDWIN C. UHLIG.